(12) United States Patent
Chatterjee et al.

(10) Patent No.: US 12,443,518 B2
(45) Date of Patent: Oct. 14, 2025

(54) SHARED MEMORY IN HIGH PERFORMANCE COMPUTING (HPC) MESSAGING SYSTEMS

(71) Applicant: Hewlett Packard Enterprise Development LP, Spring, TX (US)

(72) Inventors: Soumitra Chatterjee, Karnataka (IN); Chinmay Ghosh, Karnataka (IN); Mashood Abdulla Kodavanji, Karnataka (IN); Sharad Singhal, Belmont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/441,831

(22) Filed: Feb. 14, 2024

(65) Prior Publication Data

US 2025/0258767 A1    Aug. 14, 2025

(51) Int. Cl.
*G06F 12/02* (2006.01)

(52) U.S. Cl.
CPC ...... *G06F 12/023* (2013.01); *G06F 2212/251* (2013.01)

(58) Field of Classification Search
CPC .......................... G06F 12/023; G06F 12/0284
USPC .................................................. 711/202, 147
See application file for complete search history.

(56) References Cited

U.S. PATENT DOCUMENTS

| | | | |
|---|---|---|---|
| 2009/0106771 A1* | 4/2009 | Benner | G06F 12/1466 719/313 |
| 2019/0173981 A1* | 6/2019 | Chalmers | H04L 49/358 |
| 2022/0222196 A1* | 7/2022 | Cui | G06F 9/546 |

OTHER PUBLICATIONS

"MPI_Win_allocate", available online at <https://www.mpich.org/static/docs/v3.3/www3/MPI_Win_allocate.html>, retrieved from internat on Feb. 28, 2024, 2 pages.
"OpenSHMEM Specification", available online at <https://web.archive.org/web/20210303211945/http://www.openshmem.org/site/Specification/>, Mar. 3, 2021, 1 page.
"The Message Passing Interface (MPI) standard", available online at <qmcs.anl.gov/research/projects/mpi/>, Retrieved on Jun. 1, 2023, 2 pages.
"Window Creation", available online at <https://web.archive.org/web/20201112002109/https://www.mpi-forum.org/docs/mpi-2.2/mpi22-report/node231.htm>, Nov. 12, 2020, 3 pages.
De Sensi et al., An In-Depth Analysis of the Slingshot Interconnect, Aug. 20, 2020 (13 pages).
Github, "Open MPI", available online at <https://github.com/open-mpi/ompi/blob/f0101dcf19ee9f10ea76ab423e0b1928cce70bad/ompi/win/win.h>, Jul. 26, 2022, 4 pages.

(Continued)

*Primary Examiner* — Than Nguyen
(74) *Attorney, Agent, or Firm* — Slater Matsil, LLP (57) ABSTRACT

A first process executing on a first HPC compute node of an HPC cluster sends a write command, including a global identifier for a memory window that is globally accessible to processes executing in the HPC cluster, to an HPC memory node of the HPC cluster instructing the HPC memory node to write first data to the memory window allocated at the HPC memory node. The first data is sent by the first process to a memory window allocated on the HPC memory node. The first data is written by the HPC memory node to the memory window that includes randomly accessed, addressable memory locations.

17 Claims, 6 Drawing Sheets

(56) References Cited

OTHER PUBLICATIONS

Github, "OpenFAM: A library for programming Fabric-Attached Memory", available online at <https://openfam.github.io/index.html>, 2021, 4 pages.
OpenFabrics, "Libfabric Programmer's Manual", available online at <https://ofiwg.github.io/libfabric/v1.9.1/man/fi_trigger.3.html>, 2023, 4 pages.
Pfister, Gregory F., Chapter 42, an Introduction to the InfiniBand™ Architecture downloaded Jun. 10, 2023 (16 pages).
Wikipedia, "Lustre Object Storage Service (OSS)", available online at <https://wiki.lustre.org/Lustre_Object_Storage_Service_>, Nov. 8, 2017, 5 pages.
Wikipedia, "PageRank", available online at <https://en.wikipedia.org/w/index.php?title=PageRank&oldid=799442332>, Sep. 7, 2017, 18 pages.
"Mpi.h." Open MPI, Oct. 6, 2022. Accessed: Oct. 7, 2022. [Online]. Available: https://github.com/openmpi/ompi/blob/f0101dcf19ee9f10ea76ab423e0b1928cce70bad/ompi/win/win.h, software source code listing.
"MPI_Win_allocate," https://www.mpich.org/static/docs/v3.3/www3/MPI_Win_allocate.html , accessed Nov. 10, 2022, 2 pages.
AWS, "High Performance Computing," https://aws.amazon.com/hpc/, accessed Feb. 11, 2024, 12 pages.
Gillis et al., "message passing interface (MPI)," TechTarget, https://www.techtarget.com/searchenterprisedesktop/definition/message-passing-interface-MPI, Jul. 2022, 7 pages.
Hewlett Packard Enterprise, "High performance computing," https://www.hpe.com/us/en/what-is/high-performance-computing.html, accessed Feb. 11, 2024, 10 pages.
Hewlett Packard Enterprise Development Co, LLP, "OpenFAM Reference Implementation," https://baramya.github.io/OpenFAM.github.io/fam_allocate.html, accessed Nov. 10, 2022, 2 pages.
Hewlett Packard Enterprise Development Co, LLP, "OpenFAM Reference Implementation," https://openfam.github.io/index.html, accessed Aug. 30, 2021, 2 pages.
Hopkins, "OpenFAM: When fabric-attached memory opens up," https://community.hpe.com/t5/advancing-life-work/openfam-when-fabric-attached-memory-opens-up/ba-p/7126923, Mar. 23, 2021, 4 pages.
IBM. "What is high-performance computing (HPC)?," https://www.ibm.com/topics/hpc, accessed Feb. 14, 2024, 8 pages.
Libfabric, "Libfabric OpenFabrics," Libfabric Programmer's Manual, https://ofiwg.github.io/libfabric/, accessed Jun. 22, 2021, 3 pages.
Lustre Wiki, "Lustre Object Storage Service (OSS)," https://wiki.lustre.org/Lustre_Object_Storage_Service_(OSS), accessed Oct. 14, 2022, 5 pages.
Microsoft, "Understanding Node Metrics and Properties in HPC Cluster Manager," https://learn.microsoft.com/en-us/powershell/high-performance-computing/understanding-node-metrics-and-properties-in-hpc-cluster-manager?view=hpc19-ps, Jun. 8, 2020, 16 pages.
MPI Forum, https://www.mpi-forum.org/, accessed Feb. 11, 2024, 3 pages.
MPI Forum, "Message Passing Interface (MPI) standard," https://www.mcs.anl.gov/research/projects/mpi/, accessed Oct. 7, 2022, 2 pages.
MPI Forum, "Window Creation," https://www.mpi-forum.org/docs/mpi-2.2/mpi22-report/node231.htm, accessed Oct. 7, 2022, 3 pages.
Netapp, "What is High Performance Computing?," https://www.netapp.com/data-storage/high-performance-computing/what-is-hpc/, accessed Feb. 11, 2024, 7 pages.
Nvidia, "High-Performance Computing," https://www.nvidia.com/en-us/glossary/high-performance-computing/, accessed Feb. 11, 2024, 11 pages.
Open, "OpenSHMEM Specification," OpenSHMEM.org., http://openshmem.org/site/Specification, accessed Jun. 22, 2021, 1 page.
OpenFam, "OpenFAM: Programming Fabric-Attached Memory," https://openfam.org/, accessed Mar. 3, 2022, 4 pages.
Pfister, G.F. 2001. "An introduction to the infiniband architecture." Excerpt: High performance mass storage and parallel I/O, 42(617-632), Wiley-IEEE Press, ISBN: 9780470544839 / 9780471208099, 16 pages.
Quora, "What are the benefits of using OpenMP over MPI for distributed computing? Which one is preferred by industry experts and why?," https://www.quora.com/What-are-the-benefits-of-using-OpenMP-over-MPI-for-distributed-computing-Which-one-is-preferred-by-industry-experts-and-why/log, Apr. 12, 2023, 1 page.
Quora, "What are some popular alternatives to MPI?," https://www.quora.com/What-are-some-popular-alternatives-to-MPI/log, Apr. 12, 2023, 1 page.
Rico, "Accelerating HPC with Advanced Programming Techniques (1/2)," Arm Community, https://community.arm.com/arm-research/b/articles/posts/accelerating-hpc-with-advanced-programming-techniques-1-2, Oct. 8, 2020, 23 pages.
Sensi et al., "An In-Depth Analysis of the Slingshot Interconnect," in SC20: International Conference for High Performance Computing, Networking, Storage and Analysis, Nov. 2020, pp. 1-14. doi: 10.1109/SC41405.2020.00039, 14 pages.
Wikipedia, "High-performance computing," https://en.wikipedia.org/wiki/High-performance_computing, accessed Feb. 11, 2024, 3 pages.
Wikipedia, "PageRank," https://en.wikipedia.org/w/index.php?title=PageRank&oldid=1114540750, Accessed: Oct. 7, 2022, 16 pages.
Wikipedia, "Parallel computing," https://en.wikipedia.org/wiki/Parallel_computing, accessed Feb. 11, 2024, 22 pages.
Wikipedia, "Distributed computing," https://en.wikipedia.org/wiki/Distributed_computing, accessed Feb. 11, 2024, 15 pages.
Wikipedia, "Inter-process communication," https://en.wikipedia.org/wiki/Inter-process_communication, accessed Feb. 11, 2024, 5 pages.

\* cited by examiner

SHARED MEMORY IN HIGH PERFORMANCE COMPUTING (HPC) MESSAGING SYSTEMS

BACKGROUND

A high performance computing (HPC) cluster can be described in general terms as a collection of compute nodes that respectively include one or more local processors and local memory, and are interconnected by a dedicated high-bandwidth low-latency network. HPC clusters aggregate the computational power of multiple compute nodes to perform large-scale workloads. HPC clusters provide flexibility and scalability of HPC resources so that computing power can be well matched to current and evolving workload needs. HPC clusters can be flexibly configured to handle task parallelization, data distribution, parallel execution, cluster monitoring and control, and may combine the output of parallelized computations. Applications can execute on an HPC cluster in a local or distributed manner, such as on a single HPC compute node or on multiple HPC compute nodes.

However, large HPC clusters, including HPC clusters operating as supercomputers, typically are not single shared-memory systems, and thus, architectures based on shared memory parallel execution might not be particularly suited for execution on HPC clusters, which typically have distributed memory at each HPC compute node.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

The following disclosure provides many different examples for implementing different features. Specific examples of components and arrangements are described below to simplify the present disclosure. These are, of course, merely examples and are not intended to be limiting.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12." In the figures and the description, like numerals are intended to represent like elements.

In HPC, many use cases exist for a first process to stream a very large data set, while a second process takes some action on the results of the stream processing (see also FIG. 2), such as in the domains of search engines, artificial intelligence, machine learning, distributed applications, among types of applications that pipeline data. With message passing systems, such as MPI, having shared access to common memory can be difficult to implement and is typically limited to the local memory at a given HPC compute node. The local memory is typically subject to physical memory size constraints that can limit the size or complexity of a workload that can be used with the local memory. While methods to combine local HPC compute node memory, network storage, or secondary storage into a shared memory may be possible in message passing systems, such shared memory access would be difficult or relatively complex to implement and use, and would be associated with certain performance bottlenecks that can constrain feasibility of such an approach. For example, implementations that rely on packet-based network access using conventional network stacks would be associated with data throughput bottlenecks that could render such network memory access impractical for some HPC workloads, as well as being relatively complex to implement in software. As will be described in further detail, shared memory, without the data size or performance constraints of local memory or conventional network memory access, can be implemented using FAM in an HPC cluster that also uses a message passing system.

HPC relates to the field of aggregating computing power to provide significantly higher performance than an individual computer can provide. As just one example, HPC may be beneficial when workloads exceed the capacity of individual computer systems and users are faced with resource constraints for execution of such workloads, such as time, processor capacity, workload complexity, and management of computing infrastructure.

HPC includes systems that process data and execute calculations at a rate far exceeding other computers. The aggregate computing power of HPC serves different science, business, and engineering organizations to solve large problems that would otherwise be unapproachable or intractable on smaller computing systems. For example, HPC systems can perform quadrillions of calculations per second, while average computers can perform billions of calculations per second, which is about 10,000 times slower in some examples.

HPC has important applications for many types of workloads due to the speed and efficiency of computation provided. The application areas of HPC include scientific research, product design and development, data analysis, personalized medicine, drug discovery, molecular modeling, among other research and engineering domains, even expanding to industrial processes, disaster response, and atmospheric research.

One implementation of HPC is a supercomputer, which can be generalized as a large computer that is made up of many individual subsidiary computing elements, such as computer systems, processors, memory. Supercomputers concentrate the resources of multiple computer systems working in parallel to execute workloads involving massively complex, data-intensive processing.

A disadvantage of early supercomputers was the initial high cost and resource complexity involved with developing customized platforms for aggregating computing power. Such customized platforms were also not typically flexible or expandable to changing workload demands and a rapidly evolving technology sector. In more recent designs, a cluster architecture may be used for HPC. However, large HPC clusters operating as supercomputers typically are not single shared-memory systems, and thus, software architectures based on shared memory parallel execution might not be particularly suited for execution on some HPC clusters, which have distributed memory at each HPC compute node. Instead, software architectures based on message passing have become a preferred programming choice for HPC clusters and are used for parallel programming of HPC clusters having distributed memory at HPC compute nodes. Message passing refers to exchanging messages between applications, processes, data objects, subroutines, or other objects and may result in the starting or stopping of processes on various HPC nodes.

Executing workloads in parallel, either with or without concurrency for related computations, may be referred to as distributed computing or grid computing, in which individual tasks may be disparate in nature, leading to the use of interprocess communication for execution and workload management. Some aspects of programming parallel tasks in HPC clusters include balancing workloads among compute nodes, as well as forking and joining different computational threads or processes, to execute in a parallel manner with concurrency among HPC compute nodes, to gain performance.

Message passing is a form of interprocess communication that may be used for communication among applications and their processes executing in a parallel concurrent manner among the nodes of an HPC cluster. In a parallel and concurrent execution of a workload on an HPC cluster, each HPC node may perform tasks related to a portion of the overall workload, while message passing can be used to synchronize tasks at each HPC node, exchange data between HPC nodes, and coordinate and control the overall workload to proper completion.

Message passing can be thought of as a method for executing code using an object model for data and processes. Instead of the conventional execution method of calling the name of a program for execution, message passing involves sending a message to a receiver object and having the receiver object execute code based on the content of the message. In this manner message passing combines features of encapsulation and distribution that support parallel concurrent execution of workloads among HPC compute nodes in an HPC cluster.

Encapsulation is an attribute arising from object-oriented programming that allows software objects to invoke the execution of services at other objects without having to know internal details of the services, but rather, allows the executing object to determine the suitable service based on attributes of the message received. The executing object for the service can encapsulate the details and implementations of the service, and can include logic or decision-making ability related to execution of the service that the executing object can independently perform.

Distributed message passing allows services to be run on various HPC nodes of an HPC cluster without having to program the distribution of the services among the HPC nodes. Instead, the message passing system itself can handle identifying distributed processes, queueing distributed processes, returning distributed process results, and attending to distributed process transactional issues. Furthermore, message passing systems can support local objects or distributed objects, while the distributed objects can execute on disparate environments in different contexts.

Example message passing systems include local interprocess communication (LPC), remote procedure call (RPC), remote method invocation (RMI), common object request broker architecture (CORBA), component object model (COM), distributed component object model (DCOM), data distribution service (DDS), Microsoft® message queuing (MSMQ), Microsoft Windows Mailslots, QNX operating system, Microsoft® .NET, Emarald programming language, simple object access protocol (SOAP), Convergent Technologies operating system (CTOS), OpenBinder, and D-Bus, among others.

Certain message passing code libraries have been developed as toolkits for developers to implement message passing for parallel concurrent execution of workloads on HPC clusters, with a particular example being the message passing interface (MPI), which may be used for HPC clusters of any size, including very large HPC clusters having thousands of HPC nodes. In such large scale HPC clusters, message passing in the distributed memory environment using MPI may provide near linear performance scaling in some applications. However, the lack of a shared memory in a distributed memory message passing system, such as MPI, can be a disadvantage from which some applications would otherwise benefit.

Furthermore, a dedicated high-bandwidth low-latency network used to interconnect nodes in the HPC cluster, also referred to as "fabric," may provide shared or common memory among HPC compute nodes. Specifically, fabric-attached memory (FAM) may provide an interface to HPC memory nodes, providing very high speed storage that can be used as byte-addressable memory to augment local memory of processors at HPC compute nodes. FAM may allow applications running on HPC clusters to process huge data sets that exceed the capabilities of local memory at any HPC compute node. FAM can utilize persistent storage at HPC memory nodes to provide shared random access memory (RAM) at speeds suitable for large workloads on HPC clusters, and may not fit into existing software paradigms for memory access. That is, existing application programing interfaces (APIs) might provide inadequate support for FAM access by applications. Some APIs assume that memory is either persistent storage or local RAM for computations by processors. Some APIs allow applications to access FAM, such as the OpenFAM API specification for programming FAM.

As will be described in further detail, a method and solution for shared high speed memory in HPC messaging systems is disclosed. Certain implementations can be used to access shared memory at an HPC compute node using a global identifier that is accessible to processes executing on the HPC cluster. Certain implementations support simplified parallel concurrent execution of two or more applications that access a shared high speed memory that is byte-addressable and can be randomly accessed. Certain implementations support using FAM-based memory resources. Certain implementations support multi-tiered distributed applications that can pipeline large volumes of data in a computationally tractable manner. Certain implementations provide a high speed low latency memory that is accessible over a high speed memory used for networking HPC nodes in an HPC cluster. Certain implementations provide a byte-addressable shared memory space on HPC memory nodes that is not limited by the memory constraints of HPC compute nodes in an HPC cluster. Certain implementations allow applications and processes to access a global shared memory on HPC memory nodes using a remote memory access protocol that is a one-sided protocol. Certain implementations support simplified application access to a shared memory with minimal or no adaptation of application code.

Figure 1:
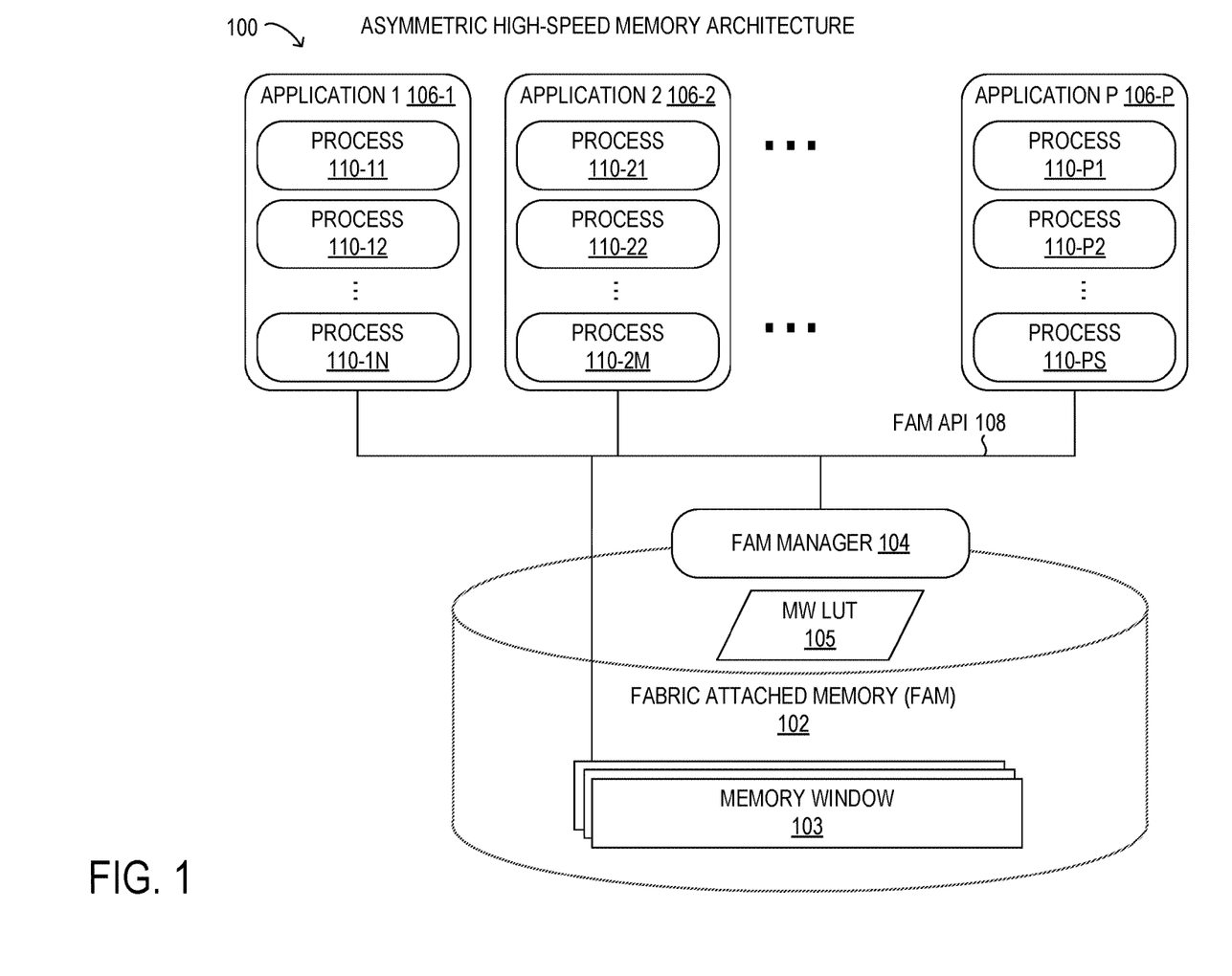
FIG. 1 is a depiction of an asymmetric high-speed memory architecture, in certain implementations.

Referring now to the drawings, FIG. 1 is a depiction of an asymmetric high-speed memory architecture 100 (or simply architecture 100), in one implementation. Architecture 100 can be a message passing environment that uses a global shared memory. As shown, architecture 100 can represent an asymmetric high-speed memory software architecture in some implementations. In some implementations, at least certain portions of architecture 100 can be implemented with logic and circuitry. In FIG. 1, architecture 100 is intended to depict logical elements and data for certain processing functionality (see also FIGS. 5 and 6). Architecture 100 may have fewer or more elements than depicted in FIG. 1.

As shown, FIG. 1 is architecture 100 includes multiple applications 106 that can each respectively execute multiple processes 110. Specifically, architecture 100 may include multiple applications 106, such as an application 1 106-1, an application 2 106-2 up to an application P 106-P, where P can be a desired integer. In some implementations, P can be a very large integer, such as 100, 1000, or greater. As shown, application 1 106-1 can execute a process 110-11, a process 110-12, and so on, up to a process 110-1N, where N can be a desired integer. Also as shown, application 2 106-2 can execute a process 110-21, a process 110-22, and so on, up to a process 110-MN, where M can be a desired integer. In generalized form, application P 106-P can execute a process 110-P1, a process 110-P2, and so on up to a process 110-PS, where S can be a desired integer. Thus, each application 106 can potentially execute one or more processes independently of other applications.

Although shown uniformly in architecture 100, each instance of application 106 and process 110 can represent different executable code that can be loaded into memory of a computer system for execution. In some implementations, multiple applications 106 can execute the same executable code in parallel, or can execute related executable code in parallel, such as portions of a single distributed application 106. Similarly, multiple processes 110 can execute the same executable code in parallel, or can execute related executable code in parallel. In certain implementations, at least some portions of application 106 and process 110 can represent functionality implemented by logic circuits, such as in an integrated circuit (IC), a field-programmable gate array (FPGA), or other type of electronic circuit.

In FIG. 1, applications 106 are shown using a FAM API 108. Applications 106 may access FAM 102 using a high-speed, low latency network referred to as a "fabric" in the context of HPC (see also, e.g., FIG. 4, which shows a high-speed local network 422), such that FAM API 108 is also used over the fabric to access FAM 102. Specifically, FAM API 108 can be configured to interact with a FAM manager 104 that is configured to provide access to one or more memory windows 103 that can be instantiated on FAM 102. FAM manager 104 may reside or may be executed at an HPC node, such as an HPC memory node or memory server, along with FAM 102 to which FAM manager 104 provides access and manages. FAM API 108 can be used to manage and access memory window 103 by applications 106, and in particular by processes 110, and is compatible with FAM manager 104. Also shown included with FAM 102 is a memory window lookup table (MW LUT) 105 that is used by FAM manager 104 to publish information about memory window 103 upon instantiation, such as listing active memory windows 103 and corresponding identifiers for memory windows 103, as will be described in further detail. Accordingly, MW LUT 105 can represent a data structure that is managed and published in the context of applications 106 by FAM manager 104, such as to indicate current memory windows 103 that have been instantiated and are active.

As shown in FIG. 1, FAM 102 represents a memory resource that can include memory arrays and internal networks or data buses to facilitate memory access. In particular implementations, FAM 102 can instantiate multiple memory windows 103 as specific memory resources that can be accessed using FAM API 108. The memory resources in FAM 102 can be scaled to various storage capacities and can include a very large amount of storage, such as several gigabytes (GB), several terabytes (TB), several petabytes (PB) or greater storage capacities, in various implementations. Furthermore, FAM 102, such as using FAM API 108, can provide byte-addressable access to memory resources, such as memory window 103, among other possible memory resources. In one example, memory window 103 can be configured in rows and columns similar to storage elements in a synchronous dynamic random access memory (SDRAM), and can be addressed in bytes and pages similarly to SDRAM. Additionally, a rate or speed of data transfer using memory window 103 may approach or be similar to that of SDRAM, such as by a throughput bandwidth of the fabric used to access FAM 102.

In operation of an example implementation, one or multiple processes 110 may join or be included in a communication group that has access to memory window 103. The processes 110 in the communication group can be associated with application 106-1 or with multiple or different applications 106. In some implementations, the processes 110 in the communication group can be executed on different compute nodes executing in an HPC cluster (see, e.g., compute nodes 402 executing in HPC cluster 400 in FIG. 4 and compute node 500 in FIG. 5). Using FAM API 108, the processes 110 in the communication group can access MW LUT 105 to look up a handle (e.g., a unique identifier) for memory window 103 that the processes 110 in the communication group can use to access memory window 103, such as for read and write operations to memory window 103. The processes 110 in the communication group can also allocate a new memory window 103 that is instantiated and managed by FAM manager 104. In particular implementations, a message passing system or interface can be used with FAM API 108 or can be compatible with FAM API 108, such as a message passing system that applications 106 use to communicate with each other in HPC cluster 400 to facilitate distributed or parallel execution of processes 110. In some implementations, the message passing system that is at least in part compatible with FAM API 108 is MPI. In certain implementations, FAM manager 104 uses FAM API 108 that is at least in part compatible with OpenFAM.

Figure 2:
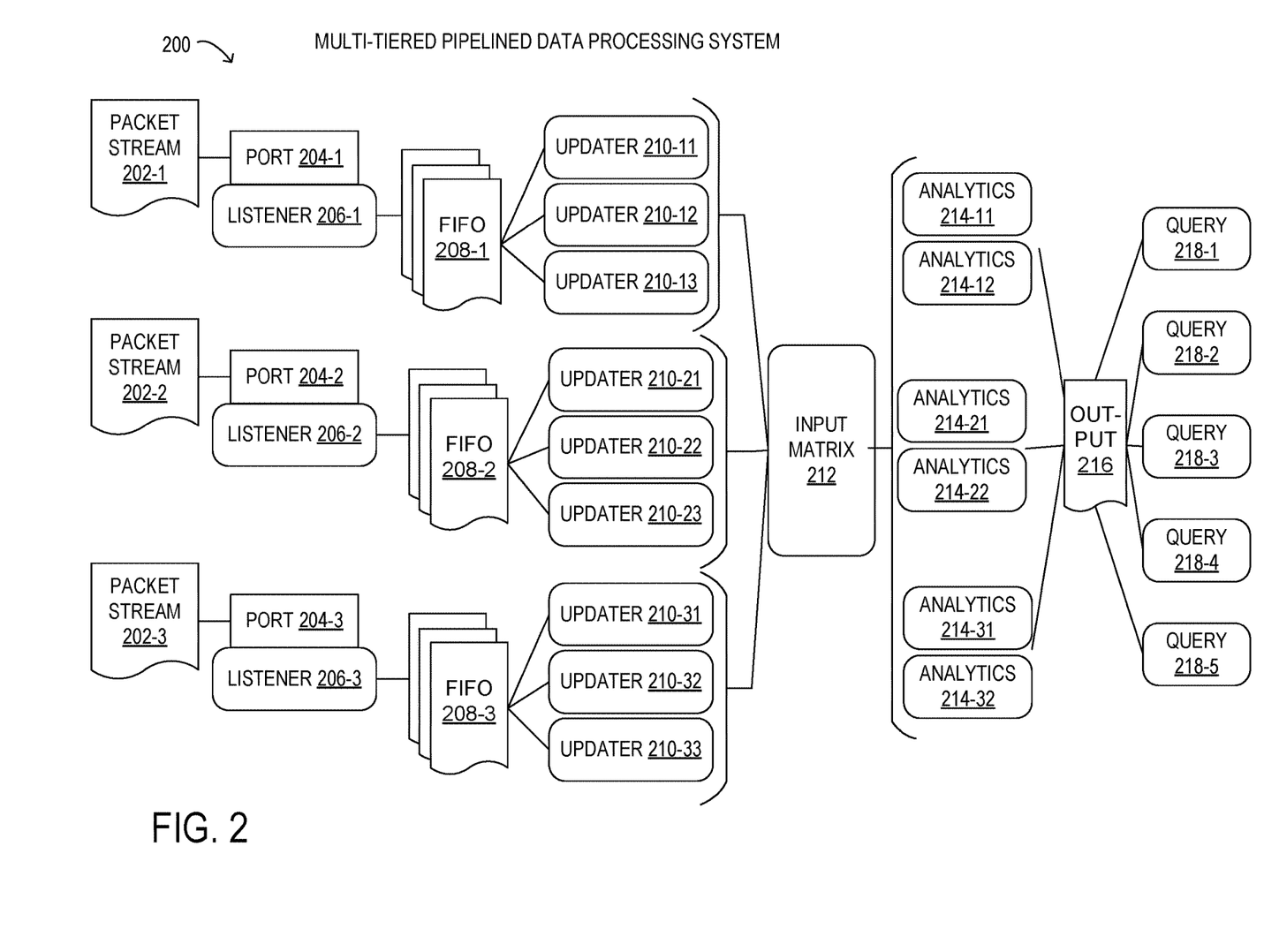
FIG. 2 is a depiction of a multi-tiered pipelined data processing system, in certain implementations.

FIG. 2 is a depiction of a multi-tiered pipelined data processing system 200 (or simply data processing system 200), in one implementation. In FIG. 2, data processing system 200 is depicted as a schematic diagram that can represent executable code or logic circuitry, in various implementations. As shown, data processing system 200 can represent a multi-tiered pipelined data processing system that uses message passing for internal communication. As will be explained below, parallel pathways shown in data processing system 200 can depict execution by parallel processes, such as processes 110 executing in one instance of application 106, or processes 110 executing on multiple instances of application 106. The multiple instances of application 106 may be executed on a single compute node (see, e.g., compute node 500 of FIG. 5) or may be executed on multiple compute nodes (see, e.g., compute nodes 402 of FIG. 4), such as in parallel execution. As will be described in further detail, a data flow in FIG. 2 can be generally from left to right in the depicted schematic diagram. In various implementations, data processing system 200 may have fewer or more elements than depicted in FIG. 2.

In FIG. 2, data processing system 200 includes several storage elements that can be implemented using FAM 102 and memory window 103, as described above with respect to FIG. 1. Specifically, data processing system 200 includes first in first out buffers (FIFO) 208, an input matrix 212, and output data 216, which each can be implemented as storage elements using FAM 102 and memory window 103. Also as shown in FIG. 2, data processing system 200 includes several applications that perform specific tasks, including a listener 206, an updater 210, an analytics 214 and a query 218, which can be example instances of applications 106 of FIG. 1 that will be described in further detail. Accordingly, the applications included in data processing system 200 can belong to a common communication group associated with memory window (e.g., a memory window 103 of FIG. 1) to provide access to storage elements such as FIFO 208, input matrix 212, output data 216. The common communication group can be part of a message passing system that applications, including applications in data processing system 200, use to communicate with each other.

In FIG. 2, to the left of input matrix 212 are three parallel data streams that end in three brackets directed to input matrix 212. In particular implementations, each of the parallel data streams, designated 1, 2, 3 with element number suffixes, can be executed by a different computer system, such as different HPC compute nodes (see, e.g., HPC compute nodes 402 of FIG. 4). Within each of the three parallel data streams, multiple instances of parallel applications, such as an updater 210, also are shown. The parallel applications can represent different instances of an application that can execute on the same or on different computer systems, in various implementations. However, because in this example all applications in data processing system 200 are part of the same communication group, each application or instance of the same application can communicate with each other, such as by message passing to each other.

In data processing system 200 as shown in FIG. 2, packet streams 202 can represent incoming data flows from a network, such as the Internet, and can include data of interest, such as an identifier for a web page or a URL, for example. A port 204 is configured to receive a packet stream 202. A corresponding listener 206 is a streaming application configured to monitor the data flow at a port 204 and to output data of interest to FIFO 208 as raw data from the incoming data flow. For example, port 204-1 receives packet stream 202-1 that is monitored by listener 206-1, which outputs raw data to FIFO 208-1; port 204-2 receives packet stream 202-2 that is monitored by listener 206-2, which outputs raw data to FIFO 208-2; and port 204-3 receives packet stream 202-3 that is monitored by listener 206-3, which outputs raw data to FIFO 208-3. From FIFO 208, one or more updaters 210 can retrieve, process, or modify the raw data, such as by normalizing the raw data into a desired standardized format. As shown in data processing system 200, three updaters 210 for example can process data from FIFO simultaneously and populate input matrix 212 with desired formatted data. Specifically, updaters 210-11, 210-12, 210-13 can retrieve and process raw data from FIFO 208-1, and output processed data to input matrix 212; updaters 210-21, 210-22, 210-23 can retrieve and process raw data from FIFO 208-2, and output processed data to input matrix 212; and updaters 210-31, 210-32, 210-33 can retrieve and process raw data from FIFO 208-3, and output processed data to input matrix 212.

In data processing system 200 shown in FIG. 2, analytics 214 can retrieve processed data from input matrix 212 and can perform analysis on the data before storing an output of the analysis in output data 216. For example, analytics 214 could apply a ranking to web page identifiers using a defined algorithm before storing the rankings in output data 216. Query 218 can perform queries, such as by using search criteria, on output data 216 that returns a result to query 218. In particular examples, query 218 can represent a search criteria for information requested from world wide web (www) that results in ranked web pages that are returned as a result. For example, analytics 214-11, 214-12 can analyze data from input matrix 212 and store the result in output data 216; analytics 214-21, 214-22 can analyze data from input matrix 212 and store the result in output data 216; and analytics 214-31, 214-32 can analyze data from input matrix 212 and store the result in output data 216. Thus, each instance of analytics 214 can be executed in parallel with other instances, such as to handle a portion of a larger data set. Also, multiple queries 218-1, 218-2, 218-3, 218-4, 218-5 can query output data 216 to generate respect results, such as in parallel.

Thus, as shown in data processing system 200 of FIG. 2, various applications 106 can access a memory window of a FAM (e.g., memory window 103 of FAM 102 of FIG. 1). For example, listener 206 can write data to FIFO 208 that can be configured within memory window 103; updater 210 can read data from FIFO 208 and write data to input matrix 212 that can be configured within memory window 103; analytics 214 can read data from input matrix 212 and write data to output data 216 that can be configured within memory window 103; and query 218 can send queries to output data 216 and receive resulting data from output data 216. Furthermore, various applications can use memory window 103 to communicate with each other, such as by passing messages or by reading and writing directly to memory window 103. For example, listener 206 could message updater 210 that certain data is available in FIFO 208, such as by writing message data to the memory window in which FIFO 208 is implemented; different instances of updater 210 could message each other to coordinate retrieval of data from FIFO 208; and different instances of analytics 214 could pass messages to each other to coordinate retrieval of data from input matrix 212.

As described above, data processing system 200 is an example of using a memory window (e.g., memory window 103 of FIG. 1) as asymmetric shared memory by different applications and processes (e.g., applications 106 and processes 110 of FIG. 1), in a parallel and simultaneous manner. Using a memory window as an asymmetric shared memory may allow fast access to a large storage volume that can, in turn, facilitate the use of multi-tiered pipelined data processing systems, such as data processing system 200, with high performance, such as high speed reads and writes to a memory window for large data sets. In summary, data processing system 200 shows how a memory window (e.g., memory window 103 of FIG. 1), as an example of global asymmetric memory residing on a FAM (e.g., FAM 102 of FIG. 1), can allow processes (e.g., processes 110 of FIG. 1) to communicate across communication groups and applications (e.g., applications 106 of FIG. 1), resulting in efficient data sharing and larger memory capacity.

Figure 3:
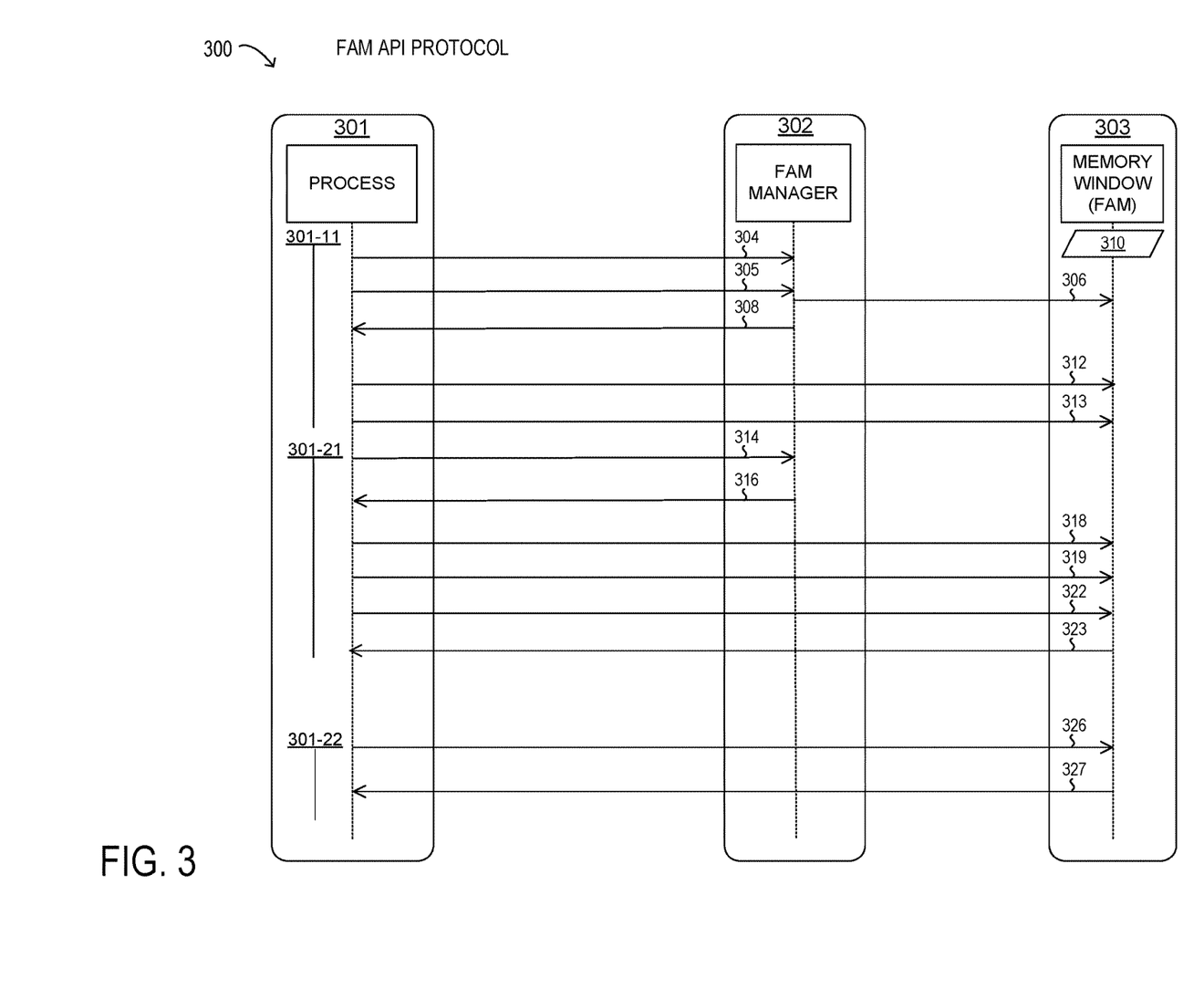
FIG. 3 is a depiction of a fabric-attached memory (FAM) application programming interface (API) protocol, in certain implementations.

Referring now to FIG. 3, a depiction of a fabric-attached memory (FAM) application programming interface (API) protocol 300 is shown, in one implementation. In FIG. 3, FAM API protocol 300 is shown as an example timeline of actions in the form of a protocol diagram that implements FAM API 108 (see FIG. 1). As shown, FAM API protocol 300 indicates a timeline going from top to bottom of the page, with messages or communications passed between a process 301, a FAM manager 302 and a memory window 303, shown as vertical lines. In particular implementations, process 301 can represent an instance of process 110, FAM manager 302 can represent an instance of FAM manager 104, memory window 303 can represent an instance of memory window 103, while a memory window look-up table (MW LUT) 310 can represent an instance of MW LUT 105, as described previously.

In FAM API protocol 300 shown in FIG. 3, communication in the form of commands or messages originating from a process 301-11, a process 301-21, and a process 301-31 are shown in an exemplary implementation. It is noted that, along with various messages shown in FAM API protocol 300, certain data can also be passed or sent, such that FAM API protocol 300 can represent passing of messages, commands, data, parameters, handles, memory addresses, among other types of data or content.

At the beginning (or top) of FAM API protocol 300, certain conditions may be assumed, namely that process 301-21 and 301-22 are already part of a communication group that can access memory window 303, but that process 301-11 is not yet part of the communication group. Further, it can be assumed that processes 301-11, 301-21, 301-22 can pass messages to each other outside of FAM API protocol 300, for example. In particular implementations of FAM API protocol 300, process 301-11 may be executed by a first application at a first HPC compute node, while processes 301-21, 301-22 may be executed by a second application at a second HPC compute node. Furthermore, it can be assumed that memory window 303 has not yet been created for reading or writing data at the start of FAM API protocol 300 (e.g., prior to sending a message 304). In some implementations, certain messages described below with respect to FAM API protocol 300 can be a function call, a response to a function call, or can include a parameter associated with a function call, such as a FAM function call.

In FIG. 3, FAM API protocol 300 can begin by process 301-11 sending message 304 to FAM manager 302 to join the communication group. Next, a message 305 is sent from process 301-11 to FAM manager 302 to open a first window. Responsive to message 305, FAM manager 302 instantiates the first window with a command 306 and allocates memory for the first window. Accordingly, the first window is allocated, formatted, and prepared for access (e.g., reading and writing data) by processes 301. At this point, an entry in MW LUT 310 can be published for the first window by FAM manager 302. In this manner, processes 301 in the communication group can look up the first window by accessing MW LUT 310 and can retrieve, for example, a handle for the first window that is usable by processes 301 to access the first window. A message 308 is sent by FAM manager 302 to process 301-11 that confirms the first window is available for access and includes a handle to the first window in message 308. Then, a write command 312 is sent by process 301-11 to write to the first window. The write command 312 can include some write data to write to the first window as well as an address for the write data. Process 301-11 then sends further write data 313 to memory window 303, which is then written to the address for the write data.

In FAM API protocol 300 shown in FIG. 3, a process 301-21 sends a message 314 to lookup the first window. Responsive to message 314, FAM manager 302 returns a first window handle to process 301-21 with a response 316. In particular implementations, the first window handle can be looked up by process 301-21 by directly accessing MW LUT 310. Furthermore, process 301-21 sends a message to a process 301-22 that includes the first window handle, which allows process 301-22 to access the first window. A write command 318 is sent by process 301-21 to write to the first window. The write command 318 can include write data to write to the first window as well as an address for the write data. Process 301-21 sends further write data 319 to memory window 303 to be written along with the address for the write data. Then, process 301-21, sends a read command 322 to read from the first window, including a read address. Process 301-21 receives the read data 323 from the first window. Then, process 301-22, having received the first window handle, sends a read command 326 to read from the first window, including a read address. Finally, process 301-22 receives the read data 327 from the first window.

In particular implementations of FAM API protocol 300, the message passing system used is MPI, while the FAM API protocol 300 supports the OpenFAM standard protocol. OpenFAM is an API facilitating access to FAM, modelled closely around interfaces provided by one-sided partitioned global address space (PGAS) libraries such as OpenSHMEM, with additional interfaces for managing FAM data beyond the lifetime of a single program. The standard implementation of OpenFAM can provide access to FAM through memory nodes (e.g., a memory server node), accessible to compute nodes via remote memory access (RMA) using a Libfabric library. Libfabric, also known as Open Fabrics Interfaces (OFI), defines a communication API for high-performance parallel and distributed applications. Libfabric is a low-level communication library that abstracts diverse networking technologies. Libfabric is developed by the OFI Working Group (OFIWG), which is a subgroup of the OpenFabrics Alliance—OFA. OpenFam and Libfabric can be used with various fabric interconnection standards or technologies, such as Slingshot or Infiniband. OpenFAM enforces security on memory window 303 based on a user identifier (UID) and a group identifier (GID) of processes, such as processes 301.

Furthermore, certain concepts and constructs from MPI may be incorporated into FAM API protocol 300. A communication group of processes 301 that support MPI can collectively create memory window 303, which can be an MPI window that is remotely accessible memory, to which all processes 301 that are members of the communication group can read from/write to without explicitly synchronizing with a process 301. In this regard, FAM API protocol 300 is an example of a one-sided protocol.

Applications 106 or processes 301 that communicate with each other can form or join an MPI communication group, whose members have access to globally shared memory window 303 having a pre-defined window name, also referred to as a window handle or a handle. In some implementations, a modified MPI interface called MPI_Win_allocate_named(<window name>, . . . ) (see step 305) is used that accepts the name of memory window 303 as an input parameter. MPI_Win_allocate_named( ) can instantiate memory window 303 as a named global shared window (e.g., global asymmetric memory), residing on FAM 102 and accessible uniformly to all processes 301 within the MPI communication group. Further, MPI_Win_allocate_named( ) can return a corresponding MPI_Win( ) handle to the allocated memory.

In particular implementations, a call to MPI_Win_allocate_named( ) can result in a call to fam_allocate( ) that is part of the OpenFAM API. The MPI_Win( ) handle can be modified to contain the FAM descriptor (e.g., the window name) returned by fam_allocate( ) that indicates whether or not the corresponding MPI Window is a global asymmetric memory (i.e., residing on FAM 102) or a conventional MPI window, to differentiate between conventional MPI Windows created by existing MPI interfaces such as MPI_Win_allocate( ). An additional customized interface MPI_Win_lookup(<window name>) may be used to locate an existing global shared memory window 303 for communication. MPI_Win_lookup( ) can call fam_lookup( ) that is part of the OpenFAM API to locate memory window 303 in FAM 102 and return the corresponding handle MPI_Win( ). Furthermore, modified MPI interfaces such as MPI_Get and MPI_Put can be used to detect if the target window is a global asymmetric memory (e.g., memory window 303) using the FAM descriptor in the MPI_Win( ) handle. If the target window is memory window 303, the calls to MPI_Get and MPI_Put can be rerouted, such as by FAM manager 302, to corresponding interfaces like fam_get and fam_put that are part of the OpenFAM API.

FAM manager 302 may ignore an existing target_rank parameter in MPI_Get and MPI_Put when global asymmetric memory window 303 is configured for use, because processes 301 are predefined within the communication group having access to memory window 303 by using non-standard customized MPI_Win_allocate_named or MPI_Win_lookup. Thereby, the MPI_Win handle returned by the new interfaces can be seamlessly used by conventional MPI interfaces such MPI_Get and MPI_Put to share data across processes 301 and applications 106.

In a particular implementation, a writer process can call MPI_Win_allocate_named( ) with a specific window name. As a result, the specific window name is sent to an HPC memory node that hosts FAM, which then allocates memory in FAM to instantiate and allocate physical memory for the memory window, and returns MPI_WIN to the writer process. Then, MPI_WIN may store access information for accessing the allocated window in FAM. Next, to write data to the memory window, the writer process can call MPI_Put( ). Since MPI_WIN has the access information, the data is written to the memory window. Furthermore, a reader process (different than the writer process and in a different MPI group) may first call MPI_Win_lookup( ) with the window name to get the access information about the memory window. This results in returning MPI_WIN to the reader process with the access information for the memory window in FAM. Then the reader process can call MPI_Get( ) to read data from the memory window. Since the memory window includes information for FAM, respective FAM APIs are called in both the writer process case and the reader process case.

In various implementations, the performance of FAM for read and, in particular, for write operations can represent a substantial improvement in comparison to read and write operations using file I/O. For example, considering write block sizes in gigabytes (GB), such as 4, 8, 16, 32, and 64 GB, it has been experimentally observed that write operation timings can be substantially faster using FAM than using file I/O, while the disparity to file I/O can become greater as the write block size increases. Accordingly, FAM can provide suitable performance for use as remote memory for applications and processes executing workloads in HPC clusters, as described herein.

Figure 4:
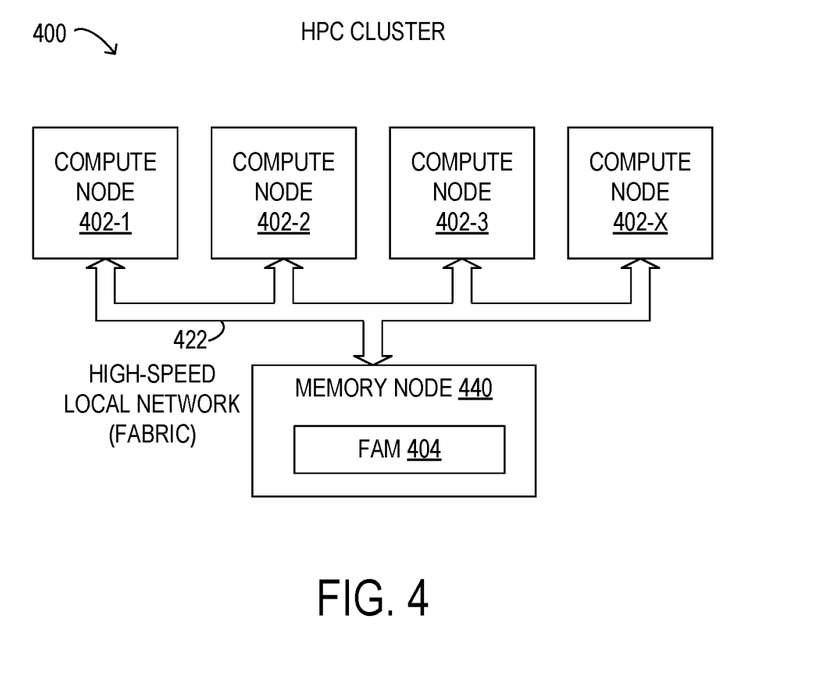
FIG. 4 is a depiction of an HPC cluster, in certain implementations.

FIG. 4 is a depiction of an HPC cluster 400, in one implementation. FIG. 4 illustrates a schematic block diagram depiction of HPC cluster 400, in accordance with one or more implementations of this disclosure. Implementations described herein may be implemented using an HPC cluster, such as HPC cluster 400 shown including multiple compute nodes 402 (see also compute node 500 in FIG. 5). Although four compute nodes 402-1, 402-2, 402-3, 402-4 are shown in FIG. 4, any number of compute nodes 402 may be used. In particular implementations, a large number of compute nodes 402 may be aggregated in HPC cluster 400 to provide greater computing capacity, and may be used to implement a supercomputer in some implementations. Accordingly, workloads, such as involved with FAM manager 104 and memory window 103 as well as application 106 shown and described above with respect to FIG. 1, may be executed in a distributed manner in HPC cluster 400, e.g., by implementing multi-node application execution, such that compute nodes 402 share processing of the workload that may be performed in a parallel or simultaneous manner among compute nodes 402.

HPC cluster 400 can be described in general terms as a collection of computing nodes 402 that respectively include a local processor and local memory, and are interconnected by a dedicated high-bandwidth low-latency network, shown as high-speed local network 422 in FIG. 4. HPC cluster 400 can accordingly aggregate and combine the computational power of multiple computing nodes 402 to perform large-scale workloads. HPC cluster 400 can provide flexibility and scalability of HPC resources so that computing power can be well matched to current and evolving workload needs, in an economical and seamless manner. HPC cluster 400 can also provide great flexibility of cluster configuration to handle task parallelization, data distribution, parallel execution, cluster monitoring and control, as well as combining the output of parallelized computations. Applications can execute on HPC cluster 400 in a local or distributed manner, such as on a single HPC compute node 402-1 or on multiple HPC compute nodes 402-2, 402-3, 402-4.

As shown in FIG. 4, HPC cluster 400 includes a memory node 440, which may represent a storage appliance that is compatible with high-speed local network 422. As shown, memory node 440 can host FAM 404 that can represent a particular implementation of FAM 102. High-speed local network 422 may be referred to as a "fabric" and may be a dedicated local bus such as Slingshot, InfiniBand, 40 Gb Ethernet, or peripheral connect interface express (PCIe), among others. Accordingly, memory node 440 can provide access to storage resources using low latency high-speed local network 422 to support HPC workloads processed using HPC cluster 400. HPC cluster 400 may include a dedicated network interface that can provide network connectivity, such as by using compute node 402.

Figure 5:
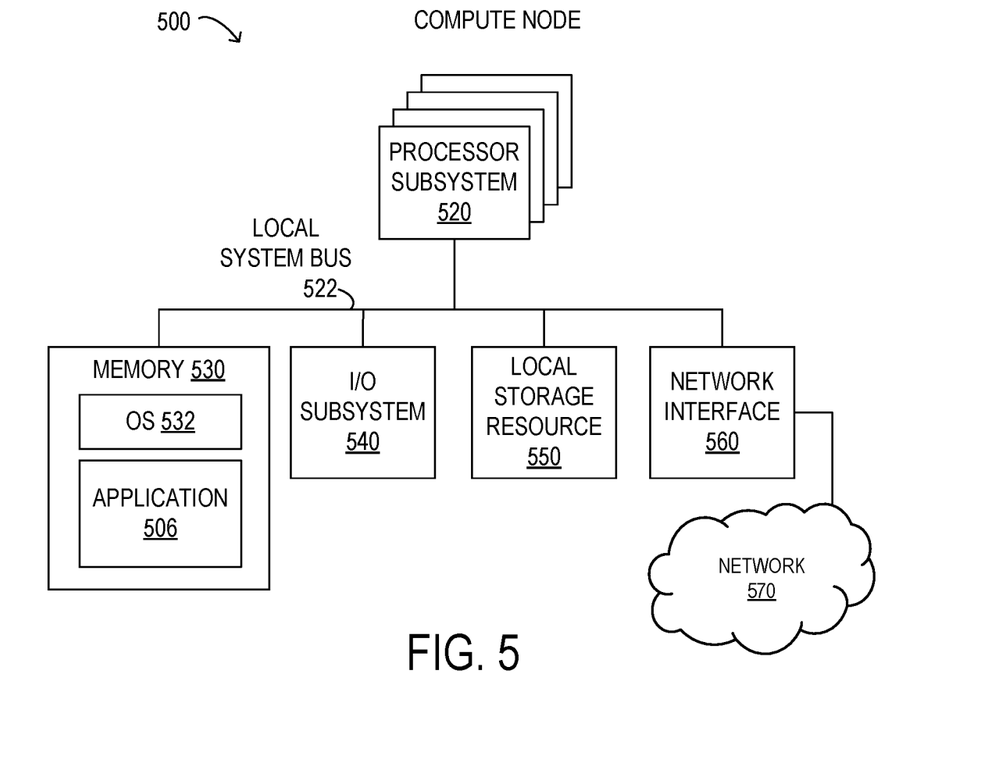
FIG. 5 is a depiction of a compute node, in certain implementations.

FIG. 5 is a depiction of a compute node 500, in one implementation. FIG. 5 illustrates a schematic block diagram depiction of compute node 500, in accordance with one or more implementations of this disclosure, that may represent compute node 502 in FIG. 5. Implementations described herein may be implemented using compute nodes, such as compute node 500, in an individual manner or in a cluster of multiple compute nodes, such as HPC cluster 400 that includes multiple compute nodes 402, as described above with respect to FIG. 4. Accordingly, compute node 500 may represent any of a variety of computer systems or computing devices, such as personal computers, desktop computers, laptops, servers, blade computers, modular computers, and HPC compute nodes, among others.

As shown in FIG. 5, compute node 500 includes a processor subsystem 520, a memory 530, a local storage resource 550, a network interface 560, an input/output (I/O) subsystem 540, and a local system bus 522 for interconnecting various local elements with processor subsystem 520. Network interface 560 may provide connection to a network 570, described in further detail below.

As shown in FIG. 5, processor subsystem 520 may include an integrated circuit, such as in the form of a chip, for interpreting and executing program instructions and process data. Processor subsystem 520 may include a general-purpose processor configured to execute program code accessible to processor subsystem 520. Processor subsystem 520 may include a special purpose processor in which certain instructions are incorporated into processor subsystem 520. Processor subsystem 520 may represent a single processor or multiple processors working together in compute node 500. Processor subsystem 520 may also represent multiple different kinds of processors, such as processors used for different types of tasks, including CPUs and GPUs used in compute node 500. Furthermore, processor subsystem 520 may include multiple cores or micro-cores for executing program code or handling different processes. In some implementations, processor subsystem 520 may interpret and execute program instructions and process data stored locally (e.g., in memory 530). In particular implementations, processor subsystem 520 may interpret and execute program instructions and process data stored remotely (e.g., in a network storage resource accessible using network interface 560).

In FIG. 5, system bus 522 may represent a variety of suitable types of bus structures, e.g., a memory bus, a peripheral bus, or a local bus using various bus architectures in selected implementations.

Also in FIG. 5, memory 530 may include a system, device, or apparatus operable to retain and retrieve program instructions and data for a period of time (e.g., computer-readable media). Memory 530 may include volatile memory such as RAM, a cache memory, magnetic memory, among others. In some implementations, memory 530 include any of various non-volatile memory that retains data after power is removed, such as a hard disk, an optical drive such as a compact disk (CD) drive or digital versatile disk (DVD) drive, a flash memory, electrically erasable programmable read-only memory (EEPROM), a memory card, a magnetic storage, an opto-magnetic storage, among others. Memory 530 may also include or represent a computer-readable medium that includes, but is not limited to, portable or non-portable storage devices, optical storage devices, and various other mediums capable of storing, containing, or carrying instruction(s) and/or data. The computer-readable medium may include a non-transitory medium that stores data and does not include carrier waves and/or transitory electronic signals propagating wirelessly or over wired connections. The computer-readable medium may store code and/or processor-executable instructions that may represent a procedure, a function, a subprogram, a program, a routine, a subroutine, a module, a software package, a class, or any combination of instructions, data structures, or program statements, among other examples.

In FIG. 5, memory 530 is shown including an operating system (OS) 532, which may represent an execution environment for various program code executing on compute node 500. OS 532 may be any of a variety of standard or customized operating systems, such as but not limited to a Microsoft Windows® operating systems, a UNIX or a UNIX-based operating system, a mobile device operating system (e.g., Google Android™ platform, Apple® iOS, among others), an Apple® MacOS operating system, an embedded operating system, among others. Memory 530 is also shown including application 506 that may represent various applications 106 described above with respect to FIG. 1.

In compute node 500, I/O subsystem 540 may include a system, device, or apparatus generally operable to receive and transmit data to or from or internally within compute node 500. In different implementations, I/O subsystem 540 may be used to support various peripheral devices, such as a touch panel, a display adapter, a keyboard, a touch pad, or a camera, among other examples. I/O subsystem 540 may represent, for example, a variety of communication interfaces, graphics interfaces, video interfaces, user input interfaces, and peripheral interfaces. For example, I/O subsystem 540 may support various output or display devices, such as a screen, a monitor, a general display device, a liquid crystal display (LCD), a plasma display, a touchscreen, a projector, a printer, an external storage device, or another output device. In some instances, I/O subsystem 540 can support multimodal systems that allow a user to provide multiple types of I/O to communicate with compute node 500.

In FIG. 5, local storage resource 550 may comprise non-volatile or persistent computer-readable media such as a hard disk drive, CD-ROM, and other type of rotating storage media, flash memory, EEPROM, or another type of solid state storage media, and may be generally operable to store instructions and data, and to permit access to stored instructions and data on demand. In some implementations, local storage resource 550 may include a storage appliance or a storage subsystem having one or more arrays of storage devices, such as for supporting redundancy, mirroring, and/or real-time data error correction and restoration.

Further, in FIG. 5, network interface 560 may facilitate connecting compute node 500 to network 570, which may represent a local area network (LAN), a wide area network (WAN) such as the Internet, mobile network, or another type of network. Network interface 560 can provide communication with another device, such as another computing node. Network interface 560 may include or support wireless networks or wired networks. The wired network media supported by network interface 560 may include analog media, universal serial bus (USB), Apple® Lightning®, Ethernet, fiber optics, a proprietary wired media, Public Switched Telephone Network (PSTN), Integrated Services Digital Network (ISDN), and an ad-hoc network media, among others. The wireless network media supported by network interface 560 may include Visible Light Communication (VLC), Worldwide Interoperability for Microwave Access (WiMAX), a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, IR communication wireless signal transfer, 3G/4G/5G/LTE cellular data network wireless signal transfer, radio wave signal transfer, microwave signal transfer, infrared signal transfer, visible light signal transfer, ultraviolet light signal transfer, wireless signal transfer along the electromagnetic spectrum, among others.

As shown in FIG. 5, network interface 560 may also include one or more Global Navigation Satellite System (GNSS) receivers or transceivers that are used to determine a location of computing node 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. In particular implementations, network interface 560 can support expansion or addition of new network interfaces or media.

At least certain portions of compute node 500 may be implemented in circuitry. For example, the components of compute node 500 can include electronic circuits or other electronic hardware, which can include a programmable electronic circuit, a microprocessor, a graphics processing unit (GPU), a digital signal processor (DSP), a central processing unit (CPU), along with other suitable electronic circuits. Certain functionality incorporated into compute node 500 may be provided using executable code that is accessible to an electronic circuit, as described above, including computer software, firmware, program code, or various combinations thereof, to perform the methods and operations described herein. When specified, non-transitory media expressly exclude transitory media such as energy, carrier signals, light beams, and electromagnetic waves.

Figure 6:
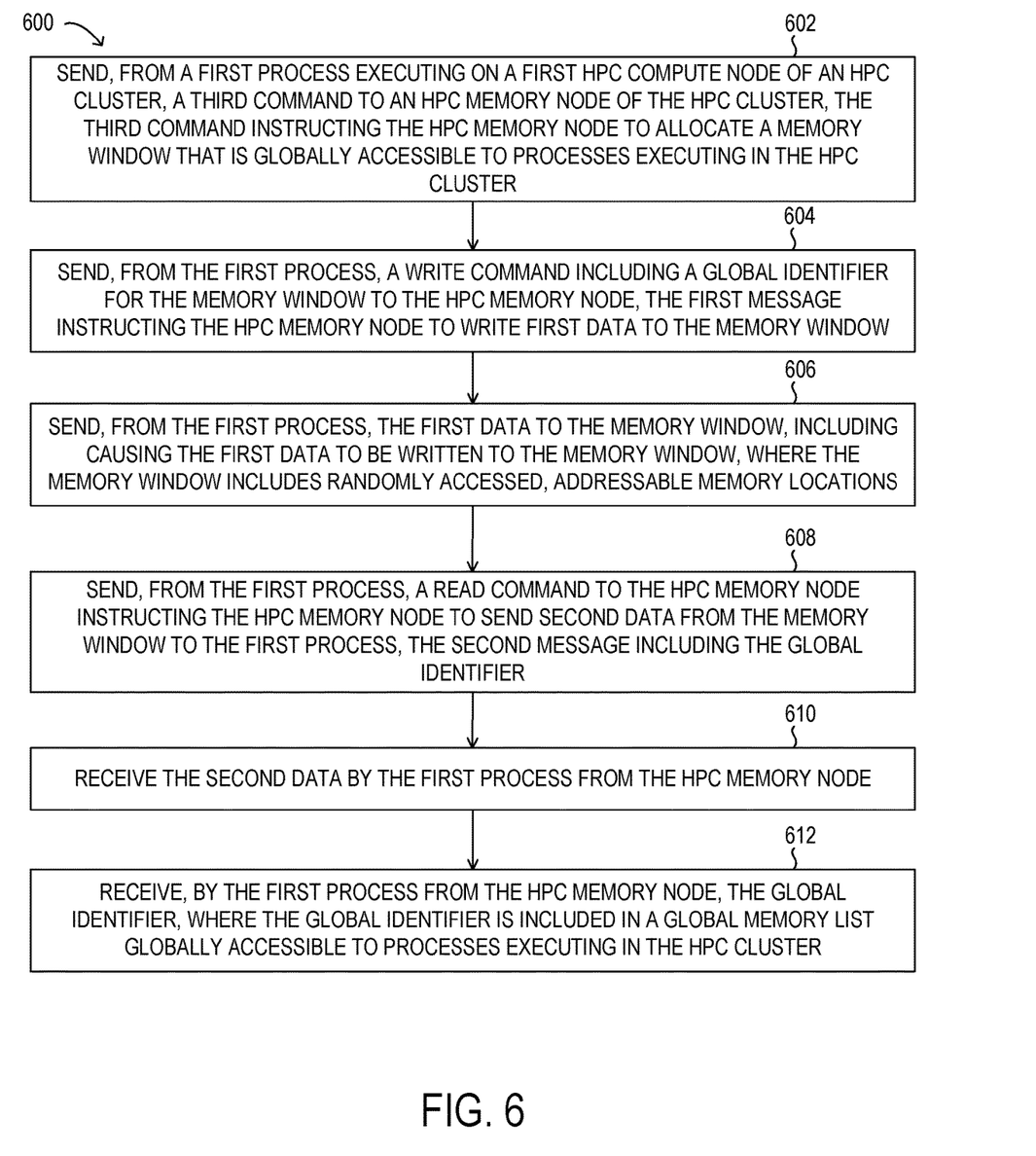
FIG. 6 is a flow chart of a method for shared memory access, in certain implementations.

FIG. 6 is a flow chart of a method 600 for shared memory access, in one implementation. Method 600 may be performed using architecture 100. Various operations in method 600 may be rearranged or omitted in various cases.

Method 600 begins at step 602 by sending, from a first process executing on a first HPC compute node of an HPC cluster, a third command to an HPC memory node of the HPC cluster, the third command instructing the HPC memory node to allocate a memory window that is globally accessible to processes executing in the HPC cluster. In certain implementations, the HPC memory node can be accessible using a FAM API, such as FAM API 108 in FIG. 1. In certain implementations, the third message can be compliant with a message passing system executing on the HPC cluster.

At step 604, a write command including a global identifier for the memory window is sent from the first process to the HPC memory node, the command instructing the HPC memory node to write first data to the memory window. In certain implementations, the write command can be compliant with the message passing system executing on the HPC cluster, the message passing system supporting distributed memory access. The message passing system may be an MPI system.

At step 606, the first data is sent from the first process to the memory window, including causing the first data to be written to the memory window, where the memory window includes randomly accessed, addressable memory locations. In particular implementations, the HPC memory node receives the first data and writes the first data to the memory window.

At step 608, a read command is sent from the first process to the HPC memory node instructing the HPC memory node to send second data from the memory window to the first process, the second message including the global identifier. In certain implementations, at least some of the first data and at least some of the second data can be transmitted concurrently via a high speed network exclusive to the HPC cluster. In certain implementations, the read command can be compliant with the message passing system executing on the HPC cluster. At step 610, the second data is received by the first process from the HPC memory node. The HPC memory node can retrieve (or read) the second data from the memory window.

At step 612, the global identifier is received by the first process from the HPC memory node, where the global identifier is included in a global memory list globally accessible to processes executing in the HPC cluster. In certain implementations, the first process and a second process executing on a second HPC compute node can be included in a communication group configured in the message passing system. In certain implementations, access to the memory window can be limited to processes executing on HPC compute nodes included in the communication group, including the first process and the second process.

Figure 7:
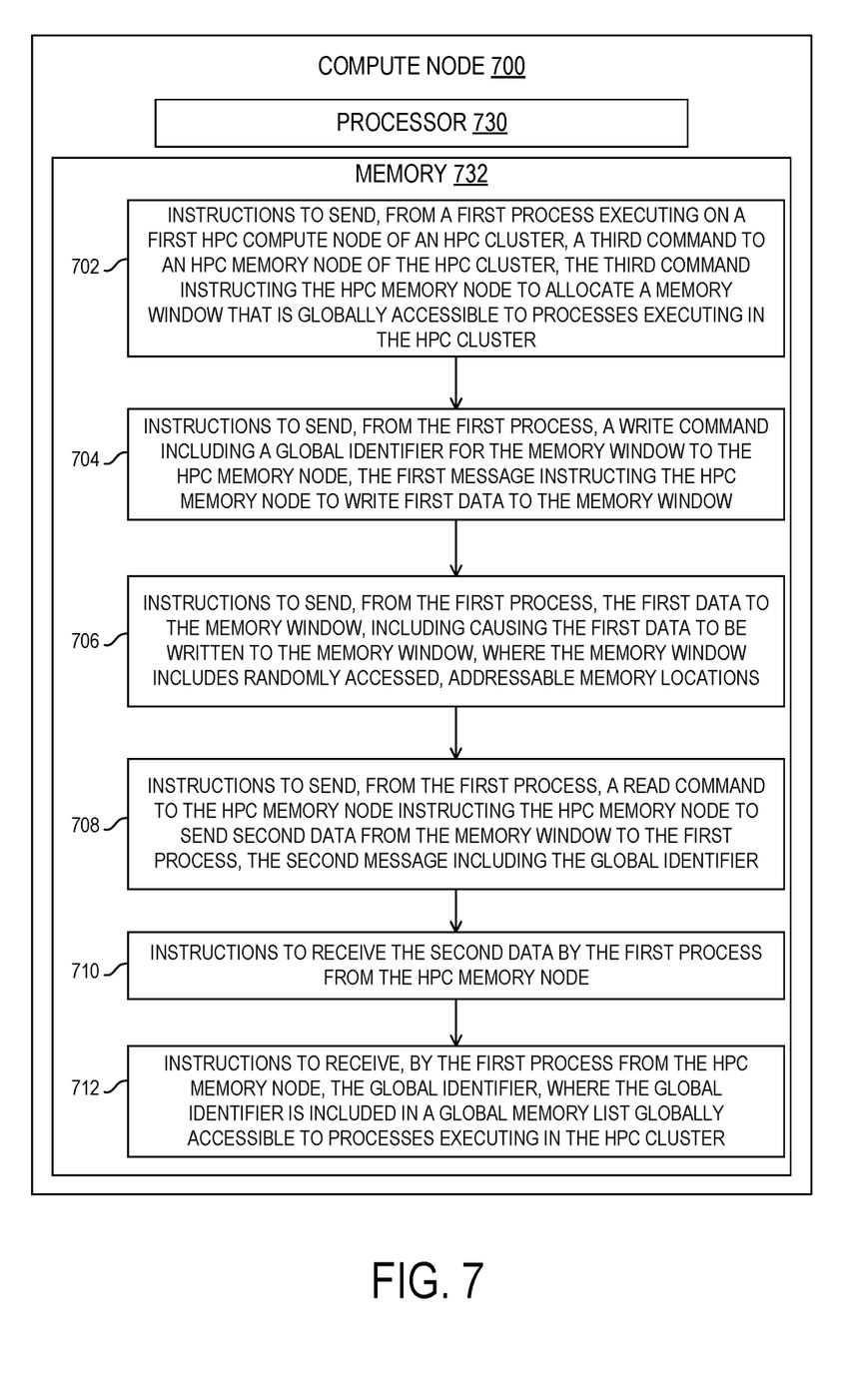
FIG. 7 is a depiction of a compute node, in certain implementations.

FIG. 7 is a block diagram of a compute node 700, according to certain implementations. Compute node 700 is an example of compute node 500 previously described for FIG. 5. Compute node 700 may include one or more processors 730 and memory 732. Memory 732 may include a non-transitory computer-readable medium that stores programming for execution by one or more of the one or more processors 730. In this implementation, one or more modules within compute node 700 may be partially or wholly embodied as software for performing any functionality described in this disclosure. For example, memory 732 may include instructions 702 to send, from a first process executing on a first HPC compute node of an HPC cluster, a third command to an HPC memory node of the HPC cluster, the third command instructing the HPC memory node to allocate a memory window that is globally accessible to processes executing in the HPC cluster. Memory 732 may include instructions 704 to send, from the first process, a write command including a global identifier for the memory window to the HPC memory node, the first message instructing the HPC memory node to write first data to the memory window. Memory 732 may include instructions 706 to send, from the first process, the first data to the memory window, including causing the first data to be written to the memory window, where the memory window includes randomly accessed, addressable memory locations. Memory 732 may include instructions 708 to send, from the first process, a read command to the HPC memory node instructing the HPC memory node to send second data from the memory window to the first process, the second message including the global identifier. Memory 732 may include instructions 710 to receive the second data by the first process from the HPC memory node. Memory 732 may include instructions 712 to receive, by the first process from the HPC memory node, the global identifier, where the global identifier is included in a global memory list globally accessible to processes executing in the HPC cluster.

As described herein, a first process executing on a first HPC compute node of an HPC cluster sends a write command, including a global identifier for a memory window that is globally accessible to processes executing in the HPC cluster, to an HPC memory node of the HPC cluster instructing the HPC memory node to write first data to the memory window allocated at the HPC memory node. The first data is sent by the first process to a memory window allocated on the HPC memory node. The first data is written by the HPC memory node to the memory window that includes randomly accessed, addressable memory locations.

Various implementations of this disclosure are summarized here. Other implementations can also be understood from the entirety of the specification as well as the claims filed herein.

In one aspect, a first method includes sending, from a first process executing on a first HPC compute node of an HPC cluster, a write command including a global identifier for a memory window that is globally accessible to processes executing in the HPC cluster, to the memory window at an HPC memory node of the HPC cluster, the write command instructing the HPC memory node to write first data to the memory window. The first method can include sending, from the first process, the first data to the memory window, including causing the first data to be written to the memory window, the memory window including randomly accessed, addressable memory locations.

In any of the disclosed implementations, the first method can include sending, from the first process, a read command to the HPC memory node instructing the HPC memory node to send second data from the memory window to the first process, the second message including the global identifier, and responsive to sending the read command, receiving the second data by the first process from the HPC memory node.

In any of the disclosed implementations of the first method, the first process and a second process executing on a second HPC compute node can be included in a communication group configured in a message passing system.

In any of the disclosed implementations of the first method, access to the memory window can be limited to processes executing on HPC compute nodes included in the communication group, including the first process and the second process.

In any of the disclosed implementations of the first method, the HPC memory node, the first HPC compute node, and the second HPC compute node can communicate via a high speed network exclusive to the HPC cluster, and the HPC memory node can be a memory server accessible via the high speed network.

In any of the disclosed implementations of the first method, at least some of the first data and at least some of the second data can be transmitted concurrently via the high speed network.

In any of the disclosed implementations, the first method can include sending, from the first process, a third command to the HPC memory node prior to sending the write command, the third command instructing the HPC memory node to allocate the memory window, and in response to sending the third command, receiving, by the first process from the HPC memory node, the global identifier. In the first method, the global identifier can be included in a global memory list globally accessible to processes executing in the HPC cluster.

In any of the disclosed implementations of the first method, the message passing system can support distributed memory access. In any of the disclosed implementations of the first method, the message passing system can be a message passing interface (MPI) system.

In any of the disclosed implementations of the first method, the HPC memory node can be accessible using a FAM API.

In another aspect, a first HPC compute node, includes one or more processors, one or more non-transitory computer-readable storage media storing programming for execution by the one or more processors. In the first HPC compute node, the programming can include instructions to execute a first process, send, from the first process, a read command, including a global identifier for a memory window that is globally accessible to processes executing in an HPC cluster that includes the first HPC compute node, to an HPC memory node of the HPC cluster, the read command instructing the HPC memory node to send first data stored in the memory window configured on the HPC memory node to the first process. In the first HPC compute node, the programming can also include instructions to receive, by the first process in response to sending the first message, the first data stored in the memory window, the memory window including randomly accessed, addressable memory locations.

In any of the disclosed implementations of the first HPC compute node, the first HPC compute node and the HPC memory node can communicate via a high speed network exclusive to the HPC cluster.

In any of the disclosed implementations of the first HPC compute node, the HPC memory node can be a memory server accessible via the high speed network.

In any of the disclosed implementations of the first HPC compute node, prior to sending the write command, the programming can also include instructions to receive, by the first process, a read command from a second process executing on a second HPC compute node different from the first HPC compute node, the second message instructing the first process to read the first data.

In any of the disclosed implementations of the first HPC compute node, prior to sending the write command, the programming can further include instructions to send, from the first process, a third command to the HPC memory node requesting the global identifier, and, responsive to sending the third command, instructions to receive, by the first process, the global identifier from the HPC memory node.

In yet another aspect, an HPC cluster includes a first HPC compute node executing an application including executing a first process. In the HPC cluster, the first process can include instructions to send, from the first process, a write command, including a global identifier for a memory window globally accessible to processes executing in the HPC cluster, to an HPC memory node, the write command instructing the HPC memory node to write first data to the memory window, and instructions to send, from the first process, first data for the memory window to the HPC memory node; and a second HPC compute node executing a second application including executing a second process. In the HPC cluster, the second process can include instructions to: send, from the second process, a read command including the global identifier for the memory window, to the HPC memory node instructing the HPC memory node to send second data stored in the memory window, and responsive to sending the read command, instructions to receive, by the second process, the second data from the HPC memory node, the memory window including randomly accessed, addressable memory locations.

In any of the disclosed implementations of the HPC cluster, the first process and the second process can be simultaneously executed.

In any of the disclosed implementations of the HPC cluster, the second data can be generated using the first data.

In any of the disclosed implementations of the HPC cluster, the first HPC compute node, the second HPC compute node, and the HPC memory node can communicate via a high-speed network exclusive to the HPC cluster.

In any of the disclosed implementations of the HPC cluster, the first data and the second data can be simultaneously transmitted over the high-speed network.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A method, comprising:
sending, from a first process executing on a first high performance computing (HPC) compute node of an HPC cluster, a write command including a global identifier for a memory window that is globally accessible to processes executing in the HPC cluster, to the memory window at an HPC memory node of the HPC cluster, the write command instructing the HPC memory node to write first data to the memory window; and
sending, from the first process, the first data to the memory window, including causing the first data to be written to the memory window, the memory window including randomly accessed, addressable memory locations;
sending, from the first process, a third command to the HPC memory node prior to sending the write command, the third command instructing the HPC memory node to allocate the memory window; and
in response to sending the third command, receiving, by the first process from the HPC memory node, the global identifier, wherein the global identifier is included in a global memory list globally accessible to processes executing in the HPC cluster.

2. The method of claim 1, further comprising:
sending, from the first process, a read command to the HPC memory node instructing the HPC memory node to send second data from the memory window to the first process, the read command including the global identifier; and
responsive to sending the read command, receiving the second data by the first process from the HPC memory node.

3. The method of claim 2, wherein the first process and a second process executing on a second HPC compute node are included in a communication group configured in a message passing system.

4. The method of claim 3, wherein access to the memory window is limited to processes executing on HPC compute nodes included in the communication group, including the first process and the second process.

5. The method of claim 3, wherein the HPC memory node, the first HPC compute node, and the second HPC compute node communicate via a high speed network exclusive to the HPC cluster, and wherein the HPC memory node is a memory server accessible via the high speed network.

6. The method of claim 5, wherein at least some of the first data and at least some of the second data are transmitted concurrently via the high speed network.

7. The method of claim 3, wherein the message passing system supports distributed memory access.

8. The method of claim 7, wherein the message passing system is a message passing interface (MPI) system.

9. The method of claim 1, wherein the HPC memory node is accessible using a fabric-attached memory (FAM) application programming interface (API).

10. A first high performance computing (HPC) compute node, comprising:
one or more processors;
one or more non-transitory computer-readable storage media storing programming for execution by the one or more processors, the programming comprising instructions to:
execute a first process;
send, from the first process, a read command, including a global identifier for a memory window that is globally accessible to processes executing in an HPC cluster that includes the first HPC compute node, to an HPC memory node of the HPC cluster, the read command instructing the HPC memory node to send first data stored in the memory window configured on the HPC memory node to the first process;
prior to sending the read command, receive, by the first process, a read message from a second process executing on a second HPC compute node different from the first HPC compute node, the read message instructing the first process to read the first data; and
receive, by the first process in response to sending the read command, the first data stored in the memory window, the memory window including randomly accessed, addressable memory locations.

11. The first HPC compute node of claim 10, wherein the first HPC compute node and the HPC memory node communicate via a high speed network exclusive to the HPC cluster.

12. The first HPC compute node of claim 11, wherein the HPC memory node is a memory server accessible via the high speed network.

13. The first HPC compute node of claim 10, wherein the programming further comprises instructions to:
prior to sending the read command, send, from the first process, a second command to the HPC memory node requesting the global identifier; and
responsive to sending the second command, receive, by the first process, the global identifier from the HPC memory node.

14. A high performance computing (HPC) cluster, comprising:
a first HPC compute node executing an application including executing a first process, the first process comprising instructions to:
send, from the first process, a write command, including a global identifier for a memory window globally accessible to processes executing in the HPC cluster, to an HPC memory node, the write command instructing the HPC memory node to write first data to the memory window; and
send, from the first process, first data for the memory window to the HPC memory node; and
a second HPC compute node executing a second application including executing a second process, the second process comprising instructions to:
send, from the second process, a read command including the global identifier for the memory window, to the HPC memory node instructing the HPC memory node to send second data stored in the memory window, wherein the second data are generated using the first data; and
responsive to sending the read command, receive, by the second process, the second data from the HPC memory node, the memory window including randomly accessed, addressable memory locations.

15. The HPC cluster of claim 14, wherein the first process and the second process are simultaneously executed.

16. The HPC cluster of claim 14, wherein the first HPC compute node, the second HPC compute node, and the HPC memory node communicate via a high-speed network exclusive to the HPC cluster.

17. The HPC cluster of claim 16, wherein the first data and the second data are simultaneously transmitted over the high-speed network.

\* \* \* \* \*